(12) United States Patent
Mattoni et al.

(10) Patent No.: US 10,871,230 B2
(45) Date of Patent: Dec. 22, 2020

(54) DYNAMIC SEALING DEVICE

(71) Applicant: EURO TECHNIQUES INDUSTRIES, Gemenos (FR)

(72) Inventors: Gaëtan Mattoni, Saint-Cyr-de-Favieres (FR); Brice Berenger, Hyeres (FR)

(73) Assignee: EURO TECHNIQUES INDUSTRIES, Gemenos (FR)

( * ) Notice: Subject to any disclaimer, the term of this patent is extended or adjusted under 35 U.S.C. 154(b) by 176 days.

(21) Appl. No.: 16/136,577

(22) Filed: Sep. 20, 2018

(65) Prior Publication Data
US 2019/0085979 A1 Mar. 21, 2019

(30) Foreign Application Priority Data
Sep. 21, 2017 (FR) .................................... 17 58756

(51) Int. Cl.
| | |
|---|---|
| *F16J 15/3228* | (2016.01) |
| *F16J 15/3236* | (2016.01) |
| *F16J 15/46* | (2006.01) |
| *F16J 15/3284* | (2016.01) |
| *B63B 21/50* | (2006.01) |

(52) U.S. Cl.
CPC ....... *F16J 15/3228* (2013.01); *F16J 15/3236* (2013.01); *F16J 15/3284* (2013.01); *F16J 15/46* (2013.01); *B63B 21/507* (2013.01)

(58) Field of Classification Search
CPC .. F16J 15/3228; F16J 15/3236; F16J 15/3284; F16J 15/46; B63B 21/507
See application file for complete search history.

(56) References Cited

U.S. PATENT DOCUMENTS

| | | | | |
|---|---|---|---|---|
| 4,165,881 | A | 8/1979 | Salter | |
| 4,256,314 | A * | 3/1981 | Berglund | F16J 15/46 277/587 |
| 5,297,804 | A * | 3/1994 | Siegrist | F16J 15/3236 277/433 |
| 5,429,374 | A * | 7/1995 | Eichenberger | F16J 15/46 277/552 |
| 7,942,423 | B2 | 5/2011 | Kondo et al. | |
| 9,702,467 | B2 * | 7/2017 | Cordua | F16J 15/0825 |
| 2014/0264137 | A1 | 9/2014 | Linser | |

FOREIGN PATENT DOCUMENTS

| | | |
|---|---|---|
| EP | 1 892 444 A1 | 2/2008 |
| FR | 2 598 769 A1 | 11/1987 |

OTHER PUBLICATIONS

French Search Report, dated May 15, 2018, from corresponding FR application No. 1758756.

* cited by examiner

*Primary Examiner* — Gilbert Y Lee
(74) *Attorney, Agent, or Firm* — Nixon & Vanderhye (57) ABSTRACT

A dynamic sealing device provides sealing between at least a first part and at least a second part having a relative rotational movement in relation to the first part. The device is formed by a seal including a body portion; a first main lip extending from the body portion; a second main lip extending from the body portion, the first lip facing the second lip; the first and second lips being configured to be energized by a first fluid so as to seal at least one of the first part and second part. The seal further includes at least one additional lip located on the body portion remotely from the first and second lips and being configured to be energized by a second fluid so as to seal at least the other of the first part and second part.

20 Claims, 5 Drawing Sheets

DYNAMIC SEALING DEVICE

FIELD OF THE INVENTION

The present invention concerns dynamic sealing devices configured to provide sealing between two parts having relative movement in relation to each other.

TECHNOLOGICAL BACKGROUND

Dynamic sealing devices installed in equipment under pressure, also called swivel joints, can have an application in petroleum production ships in the offshore field, enabling the exploitation of hydrocarbon fields at sea at depths which are sometimes very great. Floating production storage and off-loading (FPSO) units are in general formed by a ship which is movable, on account of its environment, around a mooring turret, which is geostationary. The ship is generally secured temporarily to the turret and pipes forming a network of subaqueous ducts enable fluidic communication for the transfer of a fluid between the turret and the ship.

To provide sealing between the ship and the turret and thereby provide the integrity of the fluid transfer, a dynamic sealing device may be interposed between a member fixed to the turret and a movable member of the ship. Such a device may comprise one or more seals having a U-shaped or V-shaped section.

Such a seal is provided with a body portion, with two lips and optionally with a pre-stressing spring disposed between the lips to return them to a spread position in which they provide a sealing function.

The lips have the function of providing sealing with respect to fluid while the function of the body portion is to provide the mechanical integrity of the seal and to withstand the pressure of the fluid. Such a body portion is often solid and contributes to the geometric stability of the seal while ensuring resistance to the pressure by virtue of its mechanical inertia. As for the spring, this may enable the filling of a cavity formed between the lips, with the fluid to transfer or with another fluid, referred to as pressurization fluid, by maintaining a sufficient contact pressure of the lips on the faces of the members against which they come to bear so as to avoid leakages. Such a spring, which is optional, often has a purpose of providing sealing at atmospheric pressure and at low pressure.

In operation, that is to say when the fixed and movable members are mechanically connected with each other and the sealing devices are interposed between those members, at least one of the lips and/or the body portion are likely to slide on the faces of the members against which they bear. Such sliding leads to a phenomenon of friction on the seal which may wear the seal prematurely. Furthermore, the seal undergoes an effect of creep when the latter is under load, that is to say under pressure, and subjected to a high temperature (in particular on account of the rotational movement of the movable member relative to the fixed member); which may cause a phenomenon referred to as extrusion which is also capable of wearing the seal prematurely.

SUBJECT OF THE INVENTION

The invention is directed to providing a sealing device of the same type but with improved performance, in particular with regard to reliability, with the aim in particular of guaranteeing its main function of sealing.

According to a first aspect, the invention thus relates to a dynamic sealing device configured to provide sealing between at least a first part and at least a second part having a relative rotational movement in relation to the first part. The device is formed by a seal comprising a body portion, a first main lip extending from the body portion, a second main lip extending from the body portion, the first lip facing the second lip. The first and second lips are configured to be energized by a first fluid so as to seal at least one of the first part and second part.

The seal further comprises at least one additional lip located on the body portion remotely from the first and second lips and configured to be energized by a second fluid so as to seal at least the other of the first part and second part.

In the device according to the invention, the additional lip or lips assist in providing the sealing of the seal, in particular at the location of the body portion, since they are energized by a fluid and pressed against a wall of one of the first and second parts.

This enables the body portion to be preserved which has a main function of providing sufficient mechanical inertia to the seal in order to provide the integrity thereof.

This thus makes it possible to increase the reliability of the seal over time which is to seal and also makes it possible to increase its life by virtue of an adapted use of the fluid.

Other preferred, simple, convenient and economical features of the dynamic sealing device are mentioned below.

According to an embodiment, the seal is annular, the first and second lips each extend from the body portion generally in a radial direction of the seal, and the additional lip extends in a general direction perpendicular to the radial direction of the seal.

According to an embodiment, the body portion and the first and second lips are configured such that the seal has, in section, a general shape of a U or a V.

According to an embodiment, the device comprises several additional lips.

According to an embodiment, the first fluid and the second fluid are identical.

According to an embodiment, the first fluid and the second fluid are different.

According to an embodiment, the seal has an inside face, an outside face which is an opposite face to the inside face and opposite lateral walls which meet both the inside face by a first end and the outside face by a second end which is an opposite end to the first end; the inside face delimiting the body portion at the first end of the seal, the outside face being formed by free ends of the first and second lips at the second end of the seal, and the lateral walls being formed by the respective outside faces of the first and second lips and by side walls of the body portion; and the first and second lips defining between them a cavity of the seal.

According to an embodiment, the additional lip extends from a lateral wall of the seal projecting from a side wall of the body portion.

According to an embodiment, the additional lip has an inclined face projecting from the side wall of the body portion and a bearing face which is an opposite face to the inclined face, the bearing face meeting the inside face of the seal.

According to an embodiment, the body portion is provided with a cut-out forming a cavity in the inside face of the seal, and comprises one or more additional lips provided in the body portion located at the cut-out.

According to an embodiment, the body portion is provided with a protection portion located at the inside face of the seal between the cut-out and one of its side walls.

According to an embodiment, the first and second lips are configured to be energized by the first fluid and the additional lip is configured to be energized by the second fluid; the first fluid being a pressurization fluid and the second fluid being a main fluid to transfer from one of the first and second parts to the other of the first and second parts.

According to an embodiment, the body portion is provided with a channel opening at one end into the cavity formed by the cut-out in the inside face of the seal and, at an opposite end, in a bottom of the cavity of the seal delimiting the body portion remotely from the inside face.

According to an embodiment, the first and second lips are configured to be energized by the first fluid and the additional lip or lips are configured to be energized also by the first fluid via the channel of the body portion; the first fluid being a pressurization fluid.

According to an embodiment, the seal is in two parts, each part comprising a main lip and an additional lip.

According to a second aspect, the invention also relates to a connecting mechanism for connecting at least one first part with at least one second part having a relative rotational movement in relation to the first part. The mechanism comprises a first member configured to be connected to the first part, a second member movable relative to the first member and configured to be connected to the second part, the first member and the second member being connected with each other for the transfer of a fluid from one of the first and second parts to the other of the first and second parts, as well as at least one sealing device according to the first aspect of the invention, disposed in at least one groove provided in the mechanism located at a junction between the first member and the second member.

According to an embodiment, the first member forms part of a mooring turret of a floating production unit and the second member forms part of a platform extending from a ship moored to the mooring turret.

BRIEF DESCRIPTION OF THE DRAWINGS

Other advantages, objectives and features of the present invention are given by the following description of an example embodiment, given by way of non-limiting illustration with reference to the accompanying drawings in which.

DETAILED DESCRIPTION OF AN EMBODIMENT

Figure 1:
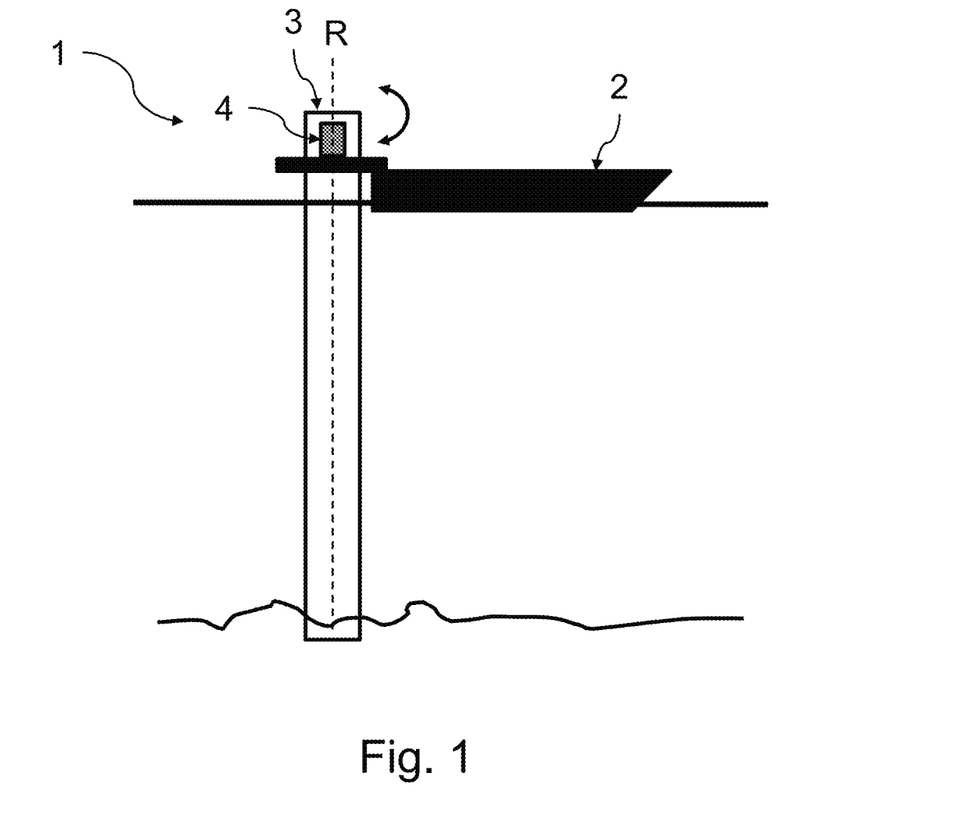
FIG. 1 diagrammatically and partially represents a floating production unit comprising a ship and a turret, of which the fluidic communication is provided in particular by a connecting mechanism provided with at least one sealing device in accordance with the invention.

FIG. 1 diagrammatically and partially represents a floating production unit 1, comprising a ship 2 and a mooring turret 3.

The turret 3 is mechanically connected here to a platform extending from the ship 2. The turret 3 is fixed whereas the ship 2 is able to turn around the turret 3. The ship is thus rotationally movable around the axis R represented in FIG. 1. Pipes (not shown) forming a network of subaquatic ducts enable fluidic communication for the transfer of a fluid between the turret 3 and the ship 2.

To provide sealing between the ship 2 and the turret 3 and thereby provide the integrity of the fluid transfer, a mechanism 4, also called swivel joint, is interposed between a fixed member (also called first member) of the turret 3 and a movable member (also called second member) of the platform of the ship 2.

The mechanism 4 provides sealing during a transfer of fluid between the turret and the platform.

Electronic communications may also be provided between the turret and the platform via the mechanism 4.

Figure 2:
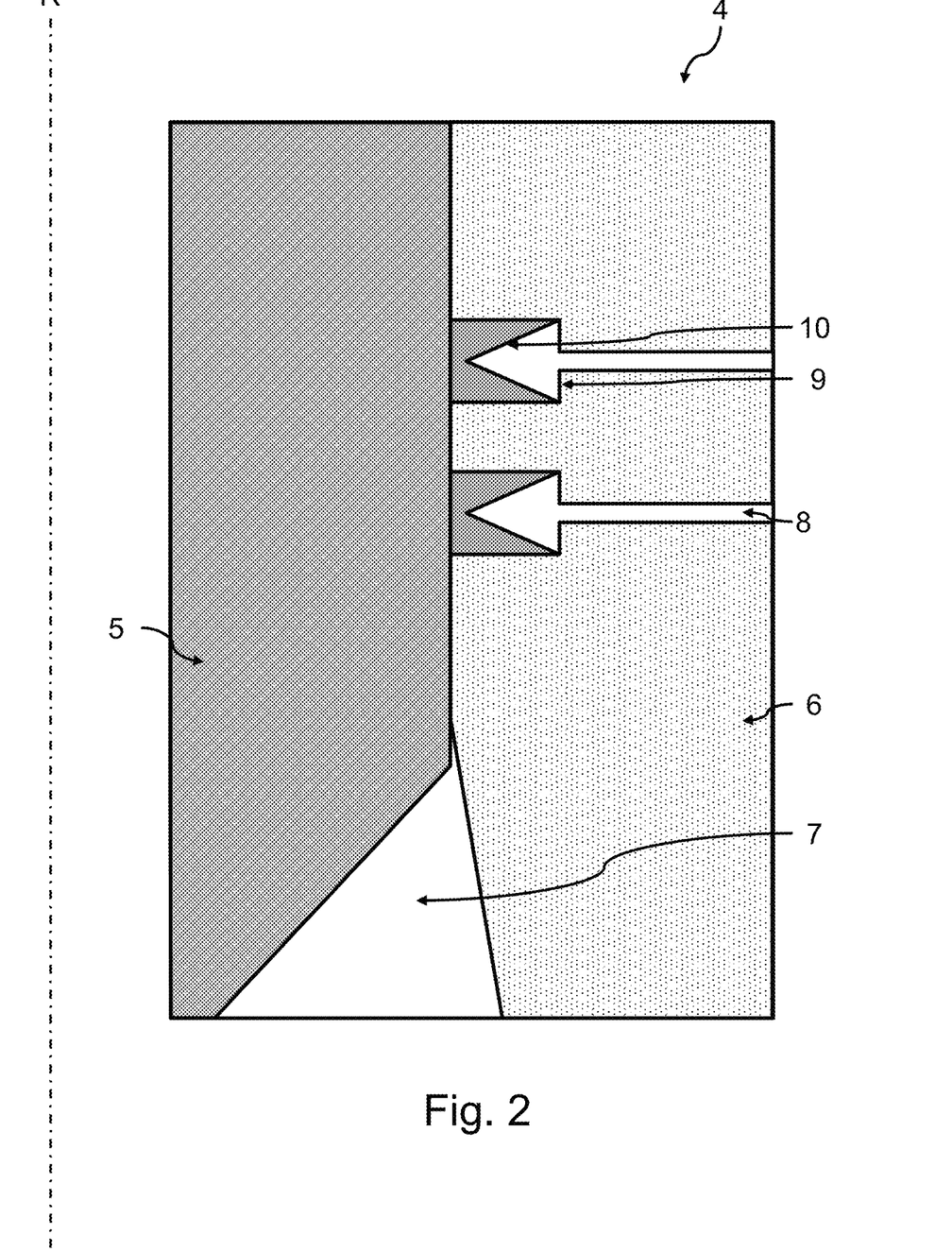
FIG. 2 is a cross-section view of the connecting mechanism of FIG. 1, showing several sealing devices according to the invention.

FIG. 2 shows a partial cross-section of the mechanism 4, provided with the fixed member 5 and the movable member 6 which are joined to each other here to provide the transfer of the fluid via a main cavity 7 provided between those members 5, 6.

The mechanism 4 is provided with radial channels 8 opening into grooves 9 formed substantially at the location of the junction between the members 5 and 6. In at least some of these grooves 9 may be accommodated a sealing device 10 according to an embodiment of the invention.

Figure 3A:
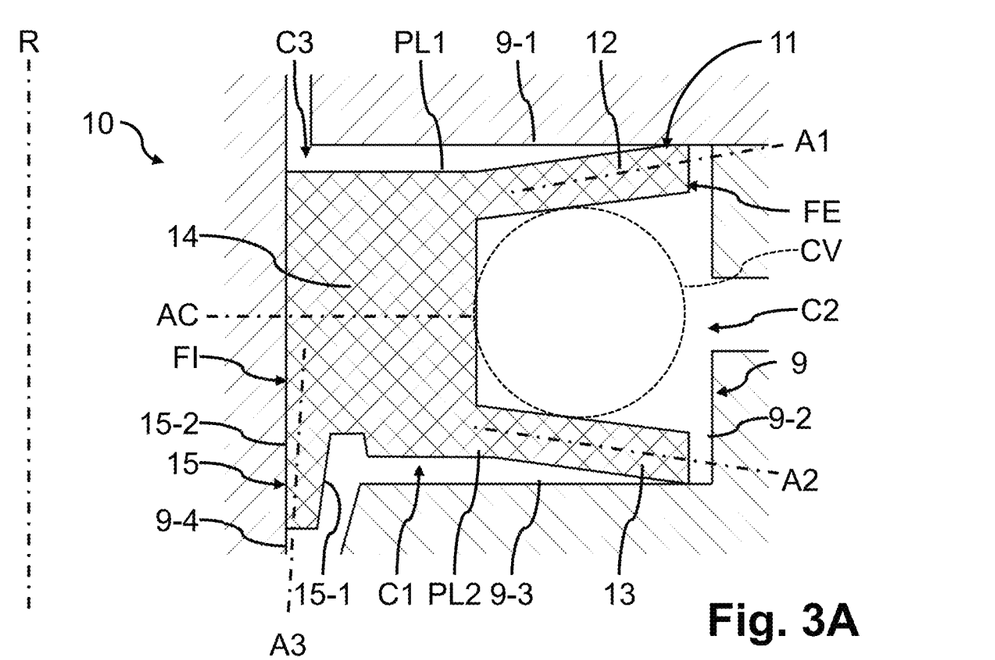
FIGS. 3A, 3B are views respectively in cross-section and in perspective of a sealing device of FIG. 2 in a first embodiment.
Figure 3B:
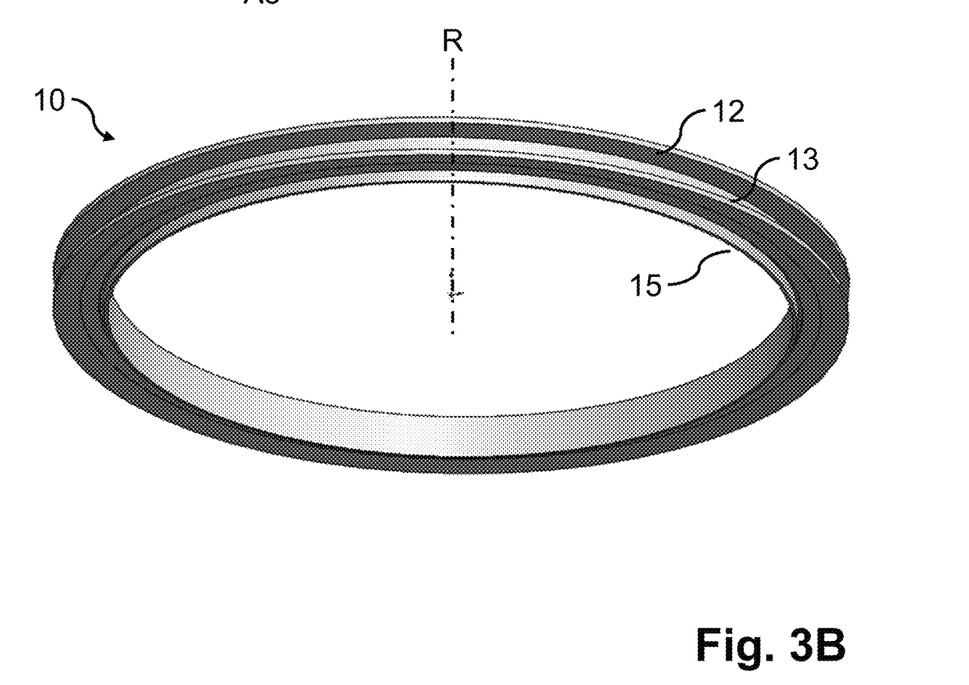
Figure 4A:
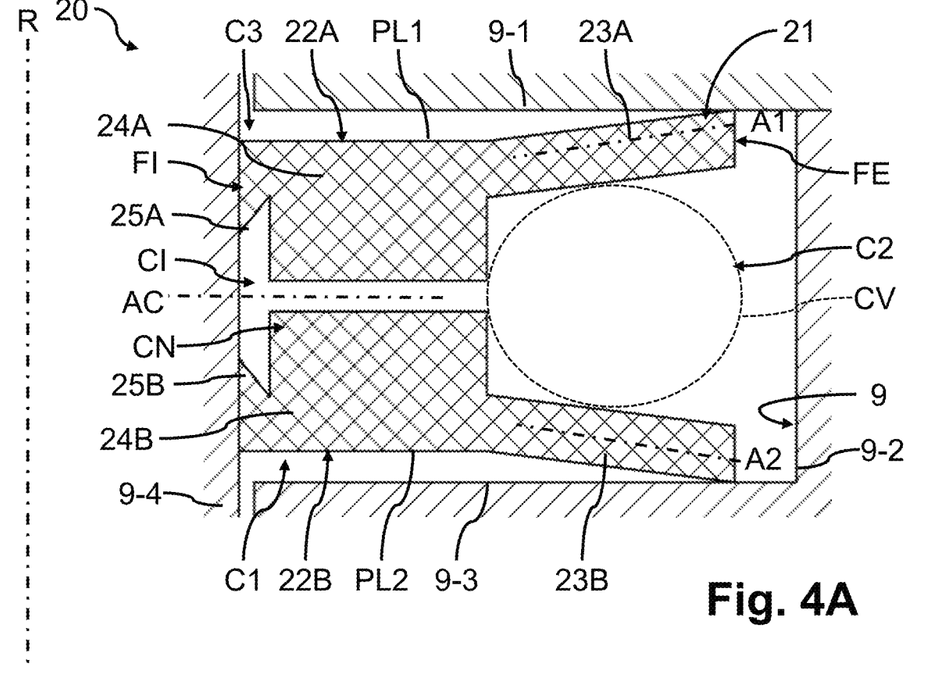
FIGS. 4A, 4B are views respectively in cross-section and in perspective of a sealing device of FIG. 2 in another embodiment.
Figure 4B:
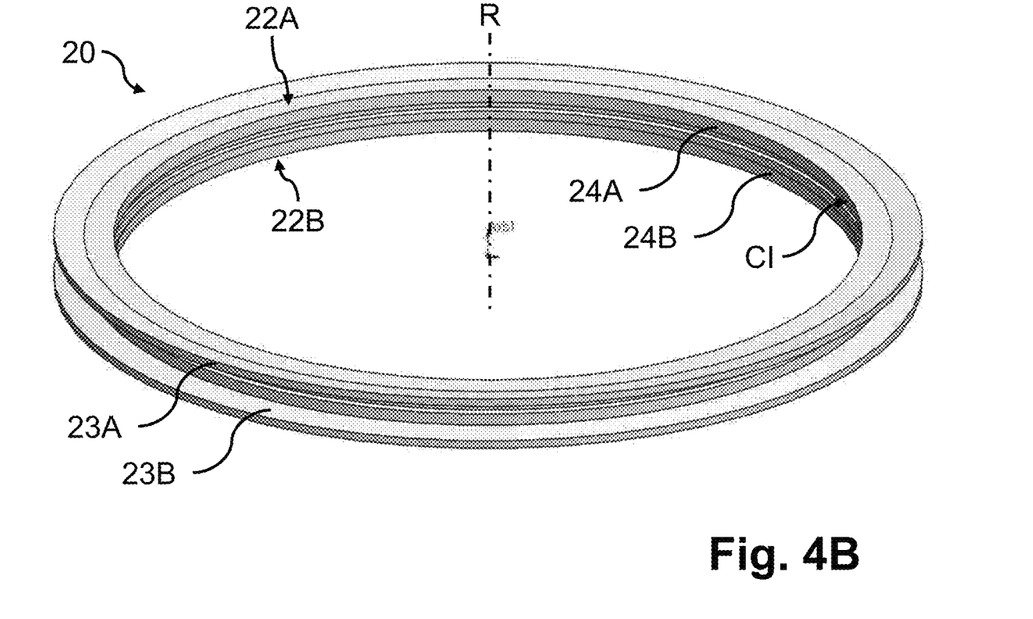
Figure 5A:
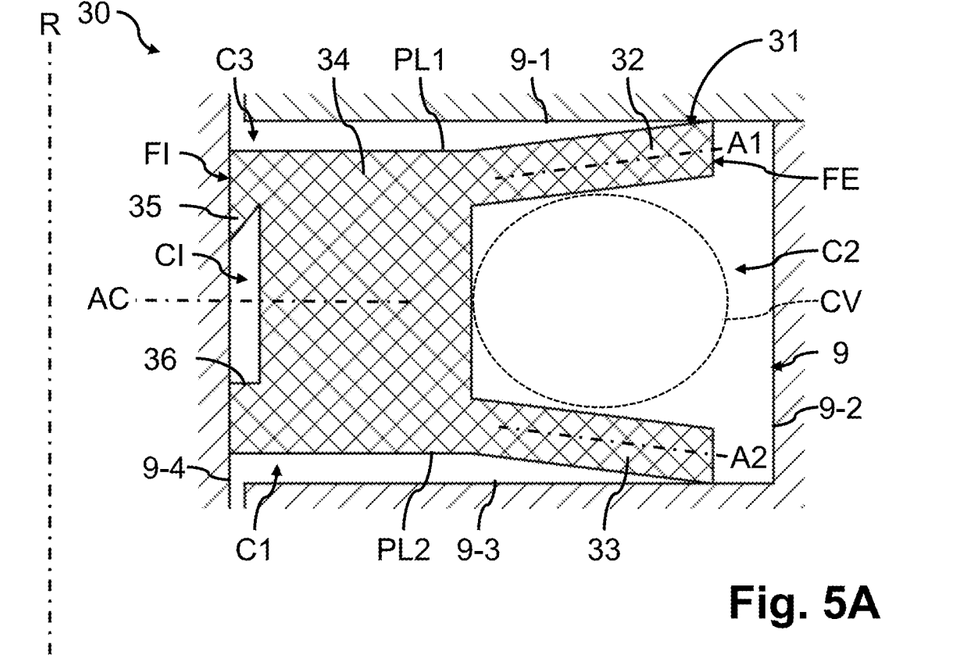
FIGS. 5A, 5B are views respectively in cross-section and in perspective of a sealing device of FIG. 2 in still another embodiment.
Figure 5B:
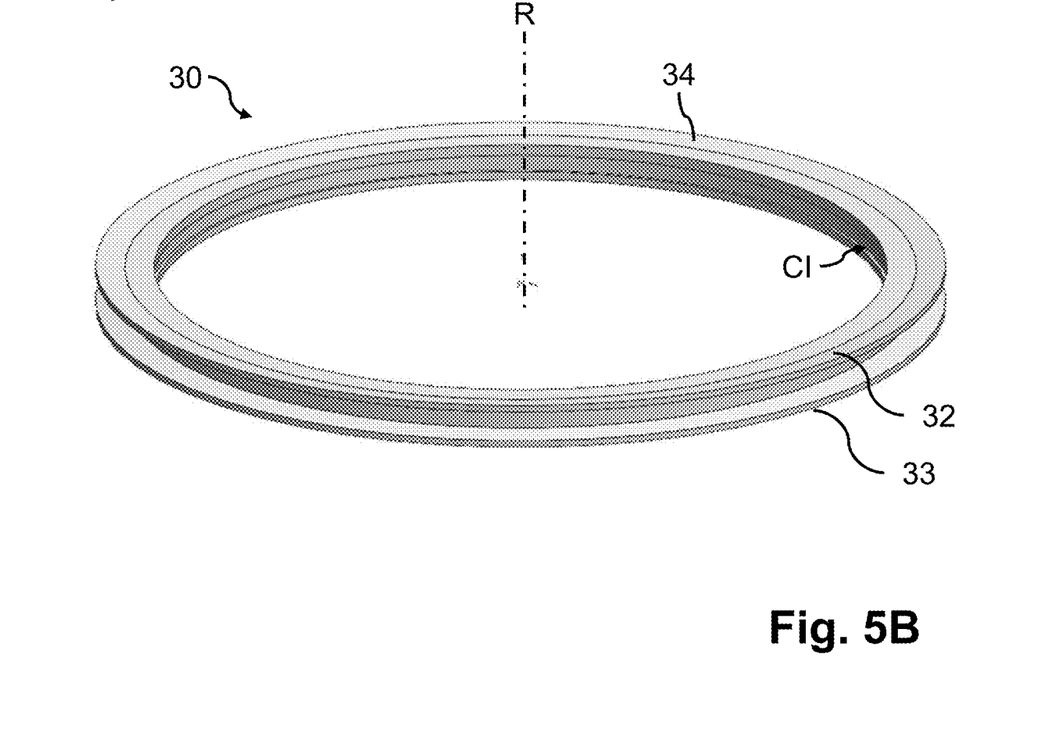

FIGS. 3 to 5 illustrate sealing devices according to different embodiments.

FIGS. 3A, 3B are views respectively in cross-section and in perspective of a sealing device 10 of FIG. 2 in a first embodiment.

The sealing device 10 comprises an annular seal 11, having an axis of revolution R, and provided with a first lip 12 and with a second lip 13 extending from a body portion 14, the first lip 12 facing the second lip 13.

The device 10 has an inside face FI, an outside face FE which is an opposite face to the inside face FI and opposite lateral walls PL1, PL2 each meeting both the inside face FI by a first end and the outside face FE by a second end which is an opposite end to the first end.

The first and second lips 12 and 13 each extend from the body portion 14 in a respective direction which is inclined relative to a radial direction of the device 10. The body portion 14 and the lips 12, 13 are thus configured such that the seal 11 has, in section, the general shape of a V.

The lips 12, 13 define between them a cavity CV (in dashed line) of the seal 11. The cavity of the seal 11 has a bottom delimiting the body portion 14 remotely from the inside face 15 of the seal, as well as sides extending from the bottom and formed by respective inside faces of the first and second lips 12 and 13.

It will be noted that the lateral walls PL1, PL2 of the seal 11 are formed by respective outside faces of the first and second lips 12 and 13 respectively, which are opposite faces to their respective inside faces.

The seal 11 comprises a third lip 15 or "additional lip" located on the body portion 14, remotely from the first and second lips or "main lips". The third lip 15 extends from the lateral wall PL2 of the seal 11 while projecting from a side wall of the body portion 14.

The first and second lips 12, 13 each extend from the body portion 14 generally in a radial direction of the seal 11, and the third lip 15 extends in a general direction perpendicular to the radial direction of the seal 11.

It will be noted that the lips 12, 13 have axes of extension A1, A2 in a plane substantially normal to the axis of revolution R of the device 10, here substantially parallel to a central axis AC of the body portion 14. The lip 15 has an axis of extension A3 substantially perpendicular to the central axis AC of the body portion, and substantially parallel to the axis of revolution R.

Furthermore, the third lip 15 has an inclined face 15-1 projecting from the lateral wall PL2 adjacent the body portion 14 and a bearing face 15-2 which is an opposite face to the inclined face, the bearing face FI meeting the inside face of the seal 11.

Here the groove 9 in which is inserted the sealing device 10, is delimited by a horizontal first wall 9-1, a vertical second wall 9-2, a horizontal third wall 9-3 which extends facing the horizontal first wall 9-1, the vertical second wall 9-2 extending between and meeting the first and third walls 9-1 and 9-3.

These walls 9-1, 9-2 and 9-3 are formed in the movable member 6.

The groove 9 in which is inserted the sealing device 10 is furthermore delimited by a vertical fourth wall 9-4 that extends facing the vertical second wall 9-2 at a distance from the first and third walls 9-1 and 9-3 which are horizontal.

This fourth wall 9-4 is formed in the system and here is part of the fixed member 5.

When the sealing device 10 is present in the groove (see FIG. 3A), a cavity C1 is formed between the lateral wall PL2 of the seal 11 adjacent the second lip 13 and the horizontal third wall 9-3; a cavity C2 is formed between the outside face 16 of the device 10 and the vertical second wall 9-2, the cavity C2 communicating with the cavity of the seal 11; and a cavity C3 is formed between the lateral wall PL1 of the seal 11 adjacent the first lip 12 and the horizontal first wall 9-1.

It will be noted that pipes for conveying fluids are provided in the first, second and third walls 9-1, 9-2 and 9-3 and open into the groove 9, and respectively into the cavities C3, C2 and C1.

A description will now be given of the cooperation of the sealing device 10 with the walls 9-1 to 9-4 of the groove 9.

The first and second lips 12 and 13 are in contact here, by their outside faces, respectively with the first and third walls 9-1 and 9-3 which are horizontal.

The body portion 14 is in contact here, at the location of the inside face FI of the seal 11, with the vertical fourth wall 9-4.

In such an arrangement, the third lip 15 and the body portion 14 can slide against the vertical fourth wall 9-4 which is movable; while the first and second lips 12 and 13 cannot or practically cannot slide against the first and third walls 9-1 and 9-3 which are horizontal.

This is what is referred to as a radial mounting of the sealing device.

It will be noted that the body portion 14 enables the cooperation and the holding of the first and second lips 12 and 13 with the rest of the seal 11. The body portion 14 is a solid part which provides the mechanical integrity of the seal 11 and enables it to withstand the pressure of a fluid.

The cavity C2 of the seal 11 is filled with a fluid, here referred to as a pressurization fluid. A pressurization fluid is a fluid used to counter-pressurize the seal 11 in order to oppose a higher pressure of the main fluid. The cavity C2 and the cavity CV of the seal 11 are filled here with such a pressurization fluid, which is confined within those cavities by the action of the first and second lips 12 and 13.

As regards the main fluid to transfer, this is present in the cavity 7 of the mechanism 4 at the junction between the fixed and movable members 5 and 6. The main fluid is also present in the cavity C1 of the groove 9, in which the lip 13 forms a barrier to prevent the main fluid from traveling beyond to the cavity C2, and possibly to the cavity C3 by the lip 12. Furthermore, the main fluid energizes and presses the third lip 15 against the wall 9-4. The main fluid is thus prevented from passing between the between the body portion 14 and the wall 9-4 towards the cavity C3. The cavity C3 of the groove 9 is empty here when the seal 11 provides its sealing function.

The "main" lips 12 and 13 are energized by the pressurization fluid, while the additional lip 15 is energized here by the main fluid. The body portion 14 does not provide the sealing alone, but is assisted by the additional lip 15.

It will be noted that a tangential force is applied by the pressurization fluid on the body portion 14, which tends to limit the extrusion of the seal.

It will be noted that the additional lip 15 does not require any additional ancillary pressurization system and can provide its function by virtue of the pressure of the main fluid.

FIGS. 4A, 4B are views respectively in cross-section and in perspective of a sealing device 20 of FIG. 2 in another embodiment.

The sealing device 20 comprises an annular seal 21 having an axis of revolution R and which is in two parts 22A, 22B, each part 22A, 22B comprising a main lip, respectively 23A, 23B extending from body portions 24A, 24B. The parts 22A, 22B, the lips 23A, 23B, and the body portions 24A, 24B face each other.

The device 20 has an inside face FI, an outside face FE which is an opposite face to the inside face FI and opposite lateral walls PL1, PL2 each meeting both the inside face FI by a first end and the outside face FE by a second end which is an opposite end to the first end.

The main lips 23A, 23B each extend from the body portions 24A, 24B in respective directions which are inclined relative to a radial direction of the device 20. The body portions 24A, 24B and the lips 23A, 23B are thus configured such that the seal 21 has, in section, the general shape of a U.

The lips 23A, 23B define between them a cavity CV (in dashed line) of the seal 21 which has a bottom delimiting the body portions 24A, 24B remotely from the inside face FI of the seal, as well as sides extending from the bottom and which are formed by respective inside faces of the lips 23A, 23B.

It will be noted that the lateral walls PL1, PL2 of the seal 21 are formed by respective outside faces of the lips 23A, 23B which are opposite faces to their respective inside faces.

Each part 22A, 22B further comprises an additional lip 25A, 25B respectively. The lips 25A, 25B are located on the body portions 24A, 24B remotely from the main lips 23A, 23B. The lips 25A, 25B in part form the inside face FI of the seal 21 projecting from a side wall of the body portions 24A, 24B, and form an inside chamber CI linked to the cavity CV formed by the main lips 23A, 23B by a channel CN which passes between the parts 22A, 22B of the seal 21.

The main lips 23A, 23B each extend from the body portions 24A, 24B generally in a radial direction of the seal 21, and the additional lips 25A, 25B extend in a general direction perpendicular to the radial direction of the seal 21.

It will be noted that the main lips 23A, 23B have axes of extension A1, A2 in a plane normal to the axis of revolution R of the device 20, here substantially parallel to a central axis AC of the seal 21. The lips 25A, 25B have axes of extension (not shown here) which are substantially perpendicular to the central axes AC of the seal 21, and substantially parallel to the axis of revolution R.

Furthermore, the additional lips 25A, 25B each have an inclined face projecting from the inside chamber CI and a bearing face which is an opposite face to the inclined face, the bearing face meeting the inside face FI of the seal 21.

As previously, the groove 9 in which is inserted the sealing device 20, is delimited by a horizontal first wall 9-1, a vertical second wall 9-2, a horizontal third wall 9-3 which extends facing the horizontal first wall 9-1, the vertical second wall 9-2 extending between and meeting the first and third walls 9-1 and 9-3.

These walls 9-1, 9-2 and 9-3 are formed in the movable member 6.

The groove 9 in which is inserted the sealing device 20 is furthermore delimited by a vertical fourth wall 9-4 that extends facing the vertical second wall 9-2 at a distance from the first and third walls 9-1 and 9-3 which are horizontal.

This fourth wall 9-4 is formed in the system and here is part of the fixed member 5.

When the sealing device 20 is present in the groove (see Figure A), a cavity C1 is formed between the lateral wall PL2 of the seal 21 adjacent the lip 22B and the horizontal third wall 9-3; a cavity C2 is formed between the outside face FE of the device 20 and the vertical second wall 9-2, the cavity C2 communicating with the inside cavity CI of the seal 21 by the channel CN; and a cavity C3 is formed between the lateral wall PL1 of the seal 21 adjacent the lip 22A and the horizontal first wall 9-1.

It will be noted that pipes for conveying fluids are provided in the first, second and third walls 9-1, 9-2 and 9-3 and open into the groove 9, and respectively into the cavities C3, C2 and C1.

A description will now be given of the cooperation of the sealing device 20 with the walls 9-1 to 9-4 of the groove 9.

The main lips 23A, 23B are in contact here, by their outside faces, respectively with the first and third walls 9-1 and 9-3 which are horizontal.

The body portions 24A, 24B are in contact here, at the location of the inside face FI of the seal 21, with the vertical fourth wall 9-4.

In such an arrangement, the additional lips 25A, 25B and the body portions 24A, 24B can slide against the vertical fourth wall 9-4 which is movable; while the main lips 23A, 23B cannot or practically cannot slide against the first and third walls 9-1 and 9-3 which are horizontal.

This is what is referred to as a radial mounting of the sealing device.

It will be noted that the body portions 24A, 24B enable the cooperation and holding of the main lips 23A, 23B with the rest of the seal 21, in particular the additional lips 25A, 25B. The body portions 24A, 24B are solid parts which provide the mechanical integrity of the seal 21 and enable it to withstand the pressure of a fluid.

The cavity C2 of the seal 21 is filled with a fluid, here the pressurization fluid, which passes by the channel CN to the inside chamber C1. The pressurization fluid is confined in those cavities by the action of the main lips 23A, 23B and the additional lips 25A, 25B and is prevented from passing between the body portions 24A, 24B and the wall 9-4 to the cavities C1, C3.

As regards the main fluid to transfer, this is present in the cavity 7 of the mechanism 4 at the junction between the fixed and movable members 5 and 6. The main fluid is also present in the cavity C1 of the groove 9, in which the lip 23B forms a barrier to prevent the main fluid from traveling beyond to the cavity C2, and possibly to the cavity C3 by the lip 23A. The cavity C3 of the groove 9 is empty here when the seal 21 provides its sealing function.

The "main" lips 23A, 23B and the "additional" lips 25A, 25B are energized by the pressurization fluid. The body portions 24A, 24B do not provide the sealing alone, but are assisted by the additional lips 25A, 25B. Furthermore, a tangential force generated by the pressurization fluid acts, by friction, to reduce the extrusion to which the seal is subjected.

The main fluid is thus isolated from the outside by the pressurization fluid at higher pressure. This fluid barrier provides the safety of the equipment in relation to dangerous fluids (in particular in relation to gases) since it is only possible for leakage to occur of the pressurization fluid into the main fluid or to the outside.

It will be noted that the additional lip does not require any additional ancillary pressurization system and can only provide its function by virtue of the pressure of the main fluid.

In a variant not illustrated, the device can be provided with a cut-out forming a cavity in the inside face of the seal, the seal being formed from a single part rather than from two parts. In this case, the channels are distributed around the seal, enabling passage between the cavity CV and the inside chamber C1.

FIGS. 5A, 5B are views respectively in cross-section and in perspective of a sealing device 30 of FIG. 2 in still another embodiment.

The sealing device 30 comprises an annular seal 31 having an axis of revolution R and two main lips 32, 33 extending from a body portion 34 and facing each other.

The device 30 has an inside face FI, an outside face FE which is an opposite face to the inside face FI and opposite lateral walls PL1, PL2 each meeting both the inside face FI by a first end and the outside face FE by a second end which is an opposite end to the first end.

The main lips 32, 33 each extend from the body portion 34 in respective directions which are inclined relative to a radial direction of the device 30. The body portion 34 and the lips 32, 33 are thus configured such that the seal 31 has, in section, the general shape of a U.

The lips 32, 33 define between them a cavity CV (in dashed line) of the seal 31 which has a bottom delimiting the body portion 34 remotely from the inside face FI of the seal, as well as sides extending from the bottom and which are formed by respective inside faces of the lips 32, 33.

It will be noted that the lateral walls PL1, PL2 of the seal 31 are formed by respective outside faces of the main lips 32, 33 which are opposite faces to their respective inside faces.

The seal 31 further comprises an additional lip 35 located on the body portion 34 remotely from the main lip 32. The seal 31 further comprises an additional wall 36 located on the body portion 34 remotely from the main lip 33, facing the additional lip 35. An inside chamber CI is formed between the additional lip 35 and the horizontal wall 36.

The main lips 32, 33 each extend from the body portion 34 generally in a radial direction of the seal 31, and the additional lip 35 extends in a general direction perpendicular to the radial direction of the seal 31.

It will be noted that the main lips 32, 33 have axes of extension A1, A2 in a plane normal to the axis of revolution R of the device 30, here substantially parallel to a central axis AC of the seal 31. The lip 35 has an axis of extension (not shown here) which is substantially perpendicular to the central axes AC of the seal 31, and substantially parallel to the axis of revolution R.

Furthermore, the additional lip 35 has an inclined face projecting from the inside chamber CI and a bearing face which is an opposite face to the inclined face, the bearing face meeting the inside face FI of the seal 31.

As previously, the groove 9 in which is inserted the sealing device 30, is delimited by a horizontal first wall 9-1, a vertical second wall 9-2, a horizontal third wall 9-3 which extends facing the horizontal first wall 9-1, the vertical second wall 9-2 extending between and meeting the first and third walls 9-1 and 9-3.

These walls 9-1, 9-2 and 9-3 are formed in the movable member 6.

The groove 9 in which is inserted the sealing device 30 is furthermore delimited by a vertical fourth wall 9-4 that extends facing the vertical second wall 9-2 at a distance from the first and third walls 9-1 and 9-3 which are horizontal.

This fourth wall 9-4 is formed in the system and here is part of the fixed member 5.

When the sealing device 30 is present in the groove (see FIG. 5A), a cavity C1 is formed between the lateral wall PL2 of the seal 31 adjacent the lip 33 and the horizontal third wall 9-3; a cavity C2 is formed between the outside face FE of the device 30 and the vertical second wall 9-2; and a cavity C3 is formed between the lateral wall PL1 of the seal 31 adjacent the lip 32 and the horizontal first wall 9-1.

It will be noted that pipes for conveying fluids are provided in the first, second and third walls 9-1, 9-2 and 9-3 and open into the groove 9, and respectively into the cavities C3, C2 and C1.

A description will now be given of the cooperation of the sealing device 30 with the walls 9-1 to 9-4 of the groove 9.

The main lips 32, 33 are in contact here, by their outside faces, respectively with the first and third walls 9-1 and 9-3 which are horizontal.

The body portion 34 is in contact here, at the location of the inside face FI of the seal 31, with the vertical fourth wall 9-4.

In such an arrangement, the additional lip 35 and the body portion 34 can slide against the vertical fourth wall 9-4 which is movable; while the main lips 32, 33 cannot or practically cannot slide against the first and third walls 9-1 and 9-3 which are horizontal.

This is what is referred to as a radial mounting of the sealing device.

It will be noted that the body portion 34 enables the cooperation and holding of the main lips 32, 33 with the rest of the seal 31, in particular the additional lip 35. The body portion 34 is a solid part which provides the mechanical integrity of the seal 31 and enables it to withstand the pressure of a fluid.

The cavity C2 of the seal 31 is filled with a fluid, here the pressurization fluid, which is confined in that cavity by the action of the main lips 32, 33.

As regards the main fluid to transfer, this is present in the cavity 7 of the mechanism 4 at the junction between the fixed and movable members 5 and 6. The main fluid is also present in the cavity C1 of the groove 9, in which the lip 33 forms a barrier to prevent the main fluid from traveling beyond to the cavity C2, and possibly to the cavity C3 by the lip 32. An amount of main fluid passes between the body portion 34, more specifically a part 34B of the body portion, and the wall 9-4, and is located in the inside chamber C1. The additional lip 35 is pressed against the wall 9-4. The variant provided consists of using two outside lips in contact with a pressurization fluid, an inside lip in contact with the main fluid and a protecting body portion.

The object is to provide reliability for the sealing at the location of the body portion 34 and to supply a protective barrier, with regard to pollution present in the main fluid.

Thus, the sealing at the location of the body portion 34 of the seal 31 is in particular provided by the additional lip 35 energized by the main fluid. The part 34B of the body portion plays the role of a physical barrier to debris and other particles which may be in the main fluid. This part 34B, situated between the cavity C1 and the additional lip 35, filters the main fluid and thus makes it possible to limit the wear by abrasion of the body portion 34 and of the additional lip 35. The two main lips 32, 33 may make it possible to limit the phenomenon of extrusion and thereby optimize the contact of the additional lip 35 and of the body portion 34 on the wall 9-4.

The cavity C3 of the groove 9 is empty here when the seal 21 provides its sealing function.

The "main" lips 32, 33 are energized by the pressurization fluid. The body portion 34 does not provide the sealing alone, but is assisted by the additional lip 35. Furthermore, a tangential force generated by the pressurization fluid acts, by friction, to reduce the extrusion to which the seal is subjected.

The main fluid is thus isolated from the outside by the pressurization fluid at higher pressure. This fluid barrier provides the safety of the equipment in relation to dangerous fluids (in particular in relation to gases) since it is only possible for leakage to occur of the pressurization fluid into the main fluid or to the outside.

It will be noted that the additional lip does not require any additional ancillary pressurization system and can only provide its function by virtue of the pressure of the main fluid.

In variants not illustrated, the device 10, 20, 30 could furthermore comprise a pre-stressed spring accommodated in the cavity CV of the seal, for example a blade spring of steel provided with two branches connected to each other by a junction portion which rests on the bottom of the cavity while the branches respectively come to bear against the inside faces of the first and second lips 12, 13; 23A, 23B; 32, 33. The spring ensures clamping of the first and second lips against the first and third walls 9 1 and 9-3 of the groove 9, forming the surfaces to seal. Furthermore, the lips may each be provided, at a respective free end, with a turned-back portion directed towards the cavity CV of the seal.

In other variants not illustrated, the spring is a part of circular section accommodated in the cavity CV of the seal or alternatively the spring is formed from several parts distributed in the cavity CV and along the seal.

In another variant not illustrated, the spring is a spiral spring of rectangular section, for example having the shape of a torus.

It will be noted that the spring is able to participate in the sealing respectively at the location of the inside faces of the first and second lips 12, 13; 23A, 23B; 32, 33.

To limit the premature wear of the seal with regard to the phenomenon of friction, the latter is formed mainly from a synthetic polymer and in particular from polyetheretherketone (PEEK), from polytetrafluoroethylene (PTFE), from equivalent fluoro-polymer materials (for example from "perfluoroalkoxy alkane" or PFA, "polychlorotrifluoroethylene" or PCTFE, ethylene tetrafluoroethylene or ETFE, etc.) or from polyurethane (PU).

My "mainly" it is meant that the seal comprises more than 50% of the indicated material.

As indicated above, the seal is annular and therefore has an axis of revolution. According to the orientation of the axis of revolution relative to the lips, it is what is referred to as a face or radial seal when the axis of revolution is substantially perpendicular to the lips (as in the illustrated example), or what is referred to as a piston seal when the axis of revolution is substantially parallel to the lips.

It has been seen that in a radial seal, the lips act on the same member, which is movable put possibly fixed whereas the body portion acts here via the ring on the other member. Furthermore, it has been seen that the use of a radial seal requires a pressurization fluid.

In variants that are not illustrated:

it is a face seal or a piston seal, in which one of the lips acts on one of the fixed or movable members while the other lip and the body portion, in relation to the ring, acts on the other member; and/or only the main fluid passes within the cavities.

It should be noted more generally that the invention is not limited to the examples described and represented.

The invention claimed is:

1. A dynamic sealing device (10, 20, 30) configured to provide sealing between at least a first part and at least a second part having a relative rotational movement in relation to the first part, the dynamic sealing device being formed by a seal (11, 21, 31) comprising:
a body portion (14, 24A, 24B, 34);
a first main lip (12, 23A, 32) extending from the body portion;
a second main lip (13, 23B, 33) extending from the body portion, the first lip facing the second lip;
the first and second lips being configured to be energized by a first fluid so as to seal at least one of the first part and second part;
at least one additional lip (15, 25A, 25B, 35) located on the body portion remotely from the first and second lips, the at least one additional lip (15, 25A, 25B, 35) being configured to be energized by a second fluid pressing against the at least one additional lip (15, 25A, 25B, 35) so as to seal the at least one additional lip (15, 25A, 25B, 35) against at least the other of the first part and second part at a location of the body portion,
wherein the at least one additional lip (15, 25A, 25B, 35) is configured so that with the second fluid pressing the at least one additional lip (15, 25A, 25B, 35) against the at least the other of the first part and second part at the location of the body portion, both the body portion and the at least one additional lip are in contact with a same surface of the other of the first part and second part to be sealed, the body portion and the at least one additional lip (15, 25A, 25B, 35) together providing a sealing function against the same surface of the other of the first part and second part.

2. The dynamic sealing device according to claim 1, wherein the seal (11, 21, 31) is annular, the first and second lips (12, 13, 23A, 23B, 32, 33) each extend from the body portion (14, 24A, 24B, 34) generally in a radial direction of the seal, and the additional lip (15, 25A, 25B, 35) extends in a general direction perpendicular to the radial direction of the seal.

3. The dynamic sealing device according to claim 2, wherein the body portion (14, 24A, 24B, 34) and the first and second lips (12, 13, 23A, 23B, 32, 33) are configured such that the seal (11, 21, 31) has a general shape of a U or a V.

4. The dynamic sealing device according to claim 2, comprising several additional lips (25A, 25B).

5. The dynamic sealing device according to claim 1, comprising several additional lips (25A, 25B).

6. The dynamic sealing device according to claim 1, wherein the first fluid and the second fluid are identical.

7. The dynamic sealing device according to claim 1, wherein the first fluid and the second fluid are different.

8. The dynamic sealing device according to claim 1, wherein,
the body portion of the seal (11, 21, 31) has an inside face (FI),
the first main lip and the second main lip define an outside face (FE) of the seal, the outside face (FE) being an opposite face to the inside face,
the body portion, the first main lip and the second main lip define opposite lateral walls (PL1, PL2) which meet both the inside face at a first end of the seal and the outside face at a second end of the seal which is an opposite end to the first end;
the inside face delimiting the body portion (14, 24A, 24B, 34) at the first end of the seal, the outside face being formed by free ends of the first and second lips at the second end of the seal, and the lateral walls being formed by the respective outside faces of the first and second lips and by side walls of the body portion; and
the first and second lips defining between them a cavity (CV) of the seal.

9. The dynamic sealing device according to claim 8, wherein the additional lip (15, 25A, 25B, 35) extends from a lateral wall (PL1, PL2) of the seal (11, 21, 31) projecting from a side wall of the body portion (14, 24A, 24B, 34).

10. The dynamic sealing device according to claim 9, wherein the additional lip (15, 25A, 25B, 35) has an inclined face projecting from the side wall of the body portion (14, 24A, 24B, 34) and a bearing face which is an opposite face to the inclined face, the bearing face meeting the inside face (FI) of the seal (11, 21, 31), and wherein the at least one additional lip (15, 25A, 25B, 35) is configured so that with the second fluid pressing the at least one additional lip (15, 25A, 25B, 35) against the at least the other of the first part and second part at the location of the body portion, both the inside face (FI) of the body portion and the bearing face (15-2) of the at least one additional lip are in contact with the same surface of the other of the first part and second part to be sealed.

11. The dynamic sealing device according to claim 8, wherein the body portion is provided with a cut-out forming a cavity in the inside face of the seal, and comprises one or more additional lips provided in the body portion located at the cut-out.

12. The dynamic sealing device according to claim 11, wherein the body portion is provided with a protection portion located at the inside face of the seal between the cut-out and one of its side walls.

13. The dynamic sealing device according to claim 11, wherein the body portion (24A, 24B) is provided with a channel opening at one end into the cavity formed by the cut-out in the inside face (FI) of the seal (21) and, at an opposite end, in a bottom of the cavity (CV) of the seal (21) delimiting the body portion remotely from the inside face.

14. The dynamic sealing device according to claim 13, wherein the first and second lips (23A, 23B) are configured to be energized by the first fluid and the additional lip or lips (25A, 25B) are configured to be energized also by the first fluid via the channel (CN) of the body portion (24A, 24B); the first fluid being a pressurization fluid.

15. The dynamic sealing device according to claim 8, wherein the first and second lips (12, 13, 32, 33) are configured to be energized by the first fluid and the additional lip (15, 35) is configured to be energized by the second fluid; the first fluid being a pressurization fluid and the second fluid being a main fluid to transfer from one of the first and second parts to the other of the first and second parts.

16. The dynamic sealing device according to claim 1, wherein the seal (21) is in two parts (22A, 22B), each part comprising a main lip (23A, 23B) and an additional lip (25A, 25B).

17. A connecting mechanism (4) for connecting at least a first part with at least a second part having a relative rotational movement in relation to the first part, comprising a first member (5) configured to be connected to the first part, a second member (6) movable relative to the first member (5) and configured to be connected to the second part, the first member (5) and the second member (6) being connected with each other for the transfer of a fluid from one of the first and second parts to the other of the first and second parts, as well as at least one sealing dynamic sealing device (10, 20, 30) according to claim 1 disposed in at least one groove (9) provided in the mechanism located at a junction between the first member (5) and the second member (6).

18. The connecting mechanism according to claim 17, wherein the first member (5) forms part of a mooring turret (3) of a floating production unit (1) and the second member (6) forms part of a platform extending from a ship (2) moored to the mooring turret.

19. The dynamic sealing device according to claim 1, wherein,
the body portion has an inside face (FI) and lateral walls (PL1, PL2),
the at least one additional lip extends from one of the lateral walls (PL2),
at least one additional lip has a first face (15-1) projecting from the one lateral wall (PL2) and a bearing face (15-2) which is an opposite face to the first face, the bearing face (15-2) meeting the inside face (FI) of the body portion,
wherein the at least one additional lip extends from the body portion and the bearing face meets the inside face of the body portion so that with the second fluid pressing the at least one additional lip against the at least the other of the first part and second part at the location of the body portion, both the inside face of the body portion and the bearing face of the at least one additional lip are in contact with the same surface of the other of the first part and second part to be sealed.

20. The dynamic sealing device according to claim 1, wherein,
the body portion has an inside face (FI),
the first main lip and the second main lip define an outside face (FE) of the seal, the outside face (FE) being an opposite face to the inside face (FI),
the body portion, the first main lip and the second main lip define opposite lateral walls (PL1, PL2) of the seal, the opposite lateral walls (PL1, PL2) each meeting both the inside face (FI) at a first end of the seal and the outside face (FE) at an opposite, second end of the seal,
The first and second main lips each extend from the body portion in a respective direction which is inclined relative to a radial direction of the seal,
the first and second main lips define there-between a cavity (CV), the cavity having a bottom delimiting the body portion remotely from the inside face (FI), the cavity having sides extending from the bottom formed by respective inside faces of the first and second main lips,
the at least one additional lip extends from one of the lateral walls (PL2) and projecting from a side wall of the body portion,
the first and second main lips each extend from the body portion in a radial direction of the seal, and the at least one additional lip extends in a direction perpendicular to the radial direction of the seal,
at least one additional lip has a first face (15-1) projecting from the one lateral wall (PL2) and a bearing face (15-2) which is an opposite face to the first face, the bearing face (15-2) meeting the inside face (FI) of the body portion,
wherein the at least one additional lip (15, 25A, 25B, 35) is configured so that with the second fluid pressing the at least one additional lip (15, 25A, 25B, 35) against the at least the other of the first part and second part at the location of the body portion, both the inside face (FI) of the body portion and the bearing face (15-2) of the at least one additional lip are in contact with the same surface of the other of the first part and second part to be sealed.

* * * * *